United States Patent [19]

Sutch

[11] 4,149,838
[45] Apr. 17, 1979

[54] PRODUCTION OF COMPOSITE ELEMENTS

[75] Inventor: Brian L. C. Sutch, Thames Ditton, England

[73] Assignee: Airfix Industries Limited, London, England

[21] Appl. No.: 792,045

[22] Filed: Apr. 28, 1977

Related U.S. Application Data

[63] Continuation of Ser. No. 640,191, Dec. 12, 1975, abandoned, which is a continuation of Ser. No. 476,291, Jun. 4, 1974, abandoned.

[30] Foreign Application Priority Data

Jun. 12, 1973 [GB] United Kingdom ............... 27981/73

[51] Int. Cl.$^2$ ............................................. B29F 1/10
[52] U.S. Cl. .................................... 425/112; 264/266;
425/126 R; 425/127; 425/129 R; 425/441
[58] Field of Search .................. 425/129 R, 112, 127,
425/122, 126 R, DIG. 47, 436, 441; 264/251,
252, 266; 249/95, 83

[56] References Cited

U.S. PATENT DOCUMENTS

| | | | |
|---|---|---|---|
| 3,154,617 | 10/1964 | Schenic et al. | 264/266 |
| 3,463,845 | 8/1969 | Depass et al. | 425/129 X |
| 3,511,902 | 5/1970 | Santangelo | 425/112 X |
| 3,534,443 | 10/1970 | Tucker | 425/441 X |

Primary Examiner—J. Howard Flint, Jr.
Assistant Examiner—William R. Briggs
Attorney, Agent, or Firm—Scrivener, Parker, Scrivener & Clarke

[57] ABSTRACT

A machine for making a composite article including a sheet material blank and an injection moulding thereon, comprises first and second cavity tools which are relatively movable between open and closed conditions and in the latter define a cavity, and a core tool movable relative to the cavity tools between open and closed conditions in the latter of which the core tool and first cavity tool together define a blank receiving cavity and the core and first and second cavity tools together define a mould cavity, the second cavity tool lying between the first cavity tool and the core tool when the tools are in open condition and supporting guide means for guiding a blank falling under gravity from a blank magazine to a position in the path of relative movement tools and between the core tool and the second cavity tool when the tools are in open condition, stop means on the core tool extending into the guide means to support a blank therein above the tools when the tools are in closed condition and to permit the blank to fall to its position in the tool path when the tools move to the open condition.

6 Claims, 11 Drawing Figures

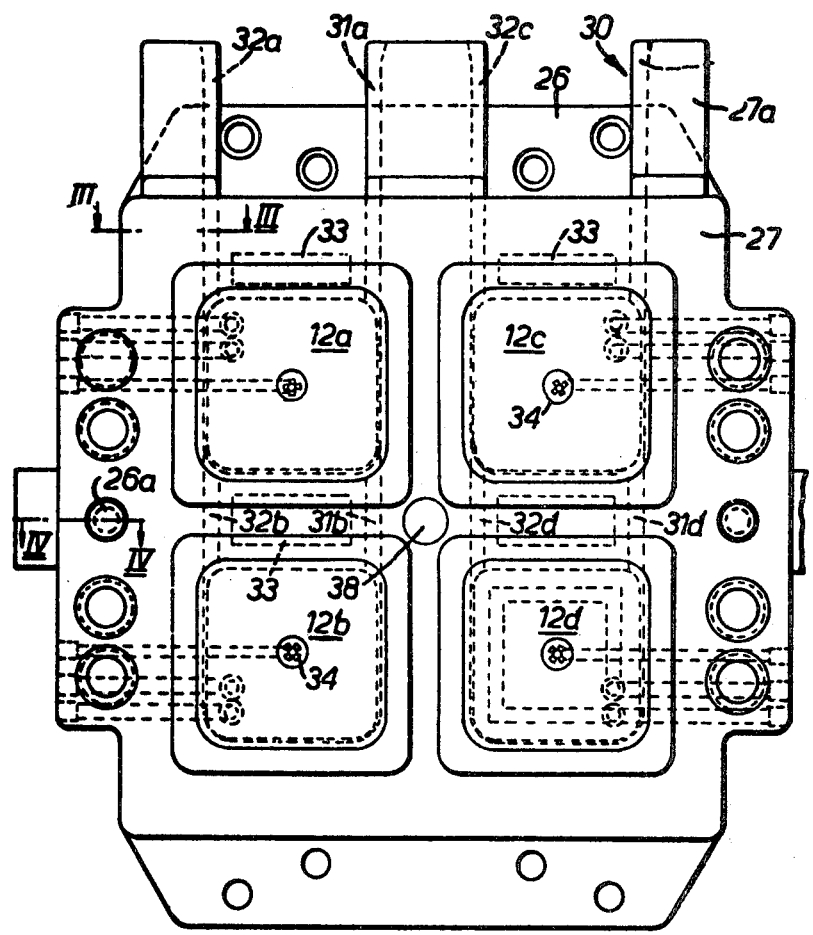
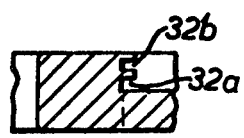
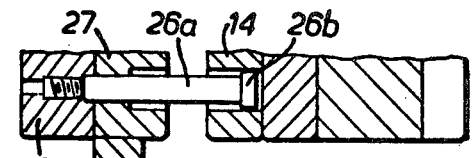
FIG.2.
FIG.3.  FIG.4.

PRODUCTION OF COMPOSITE ELEMENTS

This is a continuation of application Ser. No. 640,191 filed Dec. 12, 1975, now abandoned which is a continuation of Ser. No. 476,291, filed June 4, 1974, now abandoned.

This invention is concerned with improvements in and relating to the production of composite articles, such for example as lids or shallow receptacles, which comprise a blank and an injection moulding, which in the case of a lid is a peripheral moulding round the blank. The blank may comprise a rectangular main panel having an edge panel on each edge which in the article is displaced from the general plane of the blank. Additionally the margin of the blank adjacent each edge panel may be displaced out of the general plane of the blank and of the plane of the adjacent edge panel.

The blank may be made of a material such as card, metal, paper, synthetic plastics, board or any of these laminated, with one or more other materials.

According to one aspect of the invention there is provided apparatus for making a composite article including a blank and an injection moulding thereon, the apparatus comprising a pair of mould tools which are relatively movable between an open condition and a closed condition in the latter of which they define a blank receiving cavity in which a blank will be clamped between them and a mould cavity, guide means for guiding a blank under gravity from a position outside the path of relative movement of the tools to a position intersecting the path whereon relative movement of the tools will cause the blank to be clamped therebetween, and stop means operative to hold a blank in the guide means above the tool path when the tools are in the closed condition, and, in the open condition of the tools, to allow the blank to fall to the tool path intersecting position.

Preferably the mould tools comprise a first cavity tool comprising an end part at the periphery of which is a peripheral wall part, a second cavity tool movable relative to the first cavity tool between a cavity tool closed condition and a cavity tool open condition and which, in the cavity tool closed condition, forms with at least the wall part of the first cavity tool a part of the mould cavity and a core tool movable relative to the cavity tools between the tool closed condition, in which it defines the blank receiving cavity with the first cavity tool, and the tool open condition, and the guidance means comprises a pair of guideways for receiving opposite edges of a blank and for guiding a blank falling under gravity to the tool path intersecting position.

Preferably the guideways are positioned to that side of the second cavity tool remote from the first cavity tool whereby when in the tool path intersecting position, a blank will be driven by the core tool through the second cavity tool, thereby edge panels on the blank can be folded as the tools advance to the closed condition.

Preferably the stop means comprise a surface movable with the core tool.

The first cavity tool preferably includes an ejector part. The ejector part may comprise a part outside the peripheral wall part and, with the core tool, end part, peripheral wall part and second cavity tool, defines the moulding cavity. The ejector part is movable relative to the peripheral wall part to move a moulding away from the wall part when the cavity tools are in the open condition.

When a multi-impression tool is to be provided a second pair of tools may be provided below the first pair. In this case two pairs of guideways are provided, one behind the other, one serving the upper tools and the other being longer to serve the lower tools. The stop means will then serve to hold a blank in each pair of guideways so that, when the movement of the tools to the open condition occurs, a blank will drop down each pair of guideways, each to its respective tool path intersecting position.

The or each core tool may have a vacuum head on its blank engaging face to maintain relative positioning of the core tool and blank during relative closing movement.

The invention will be better understood from the following description of an embodiment thereof, given by way of example only, with reference to the accompanying drawings, in which:

FIG. 2 is a front elevation of the core tool;

FIG. 3 is a section along the line III—III of FIG. 2;

FIG. 4 is a section along the line IV—IV of FIG. 2;

Figure 1:
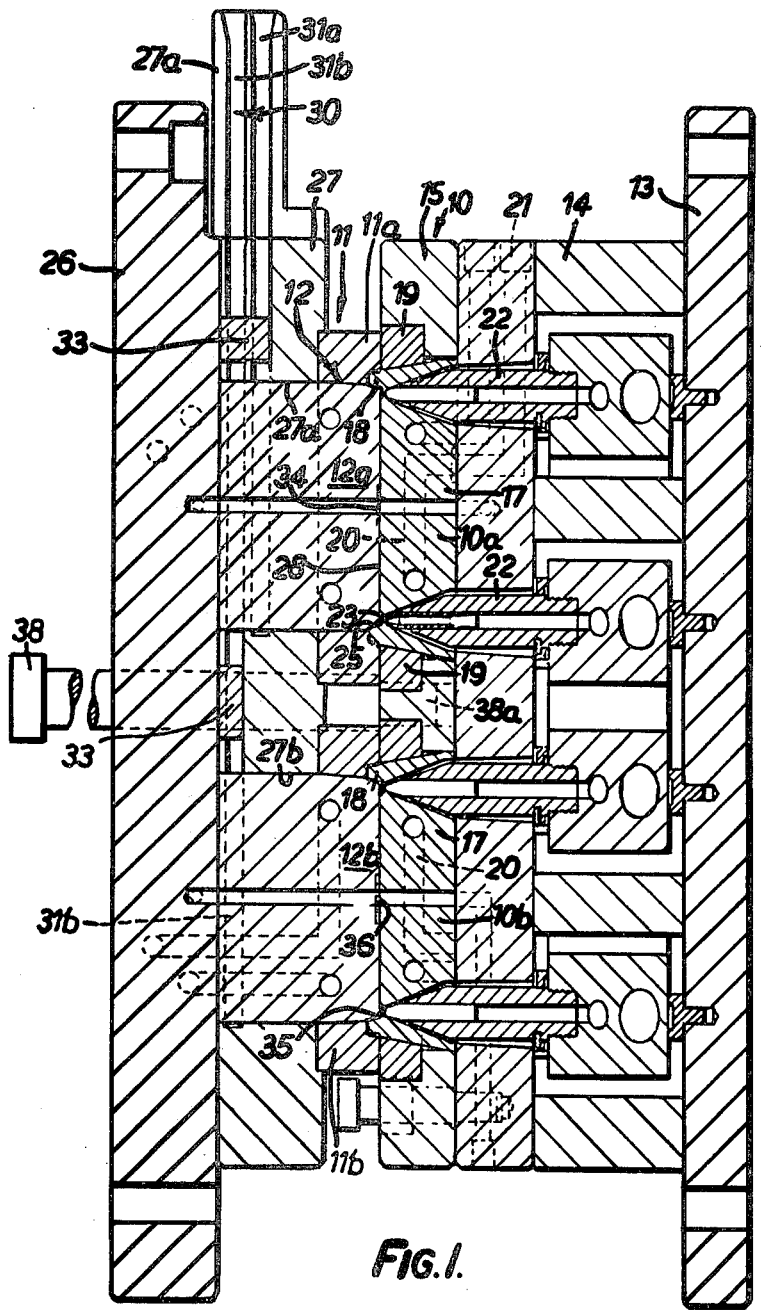
FIG. 1 is a diagrammatic vertical section through multi-impression mould tools for setting up in an injection moulding machine.
Figure 5:
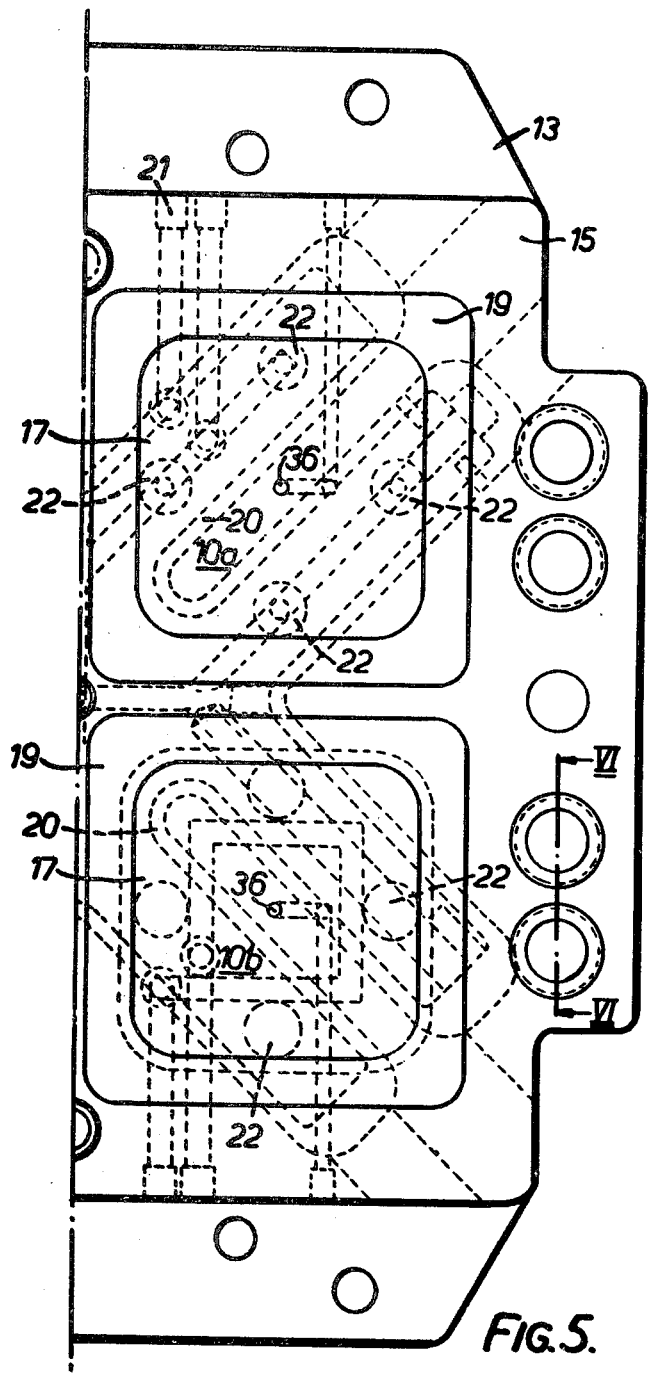
FIG. 5 is a front elevation of half of the cavity tool with detail of the wall portions omitted.

The lid comprises a blank 1 (FIG. 7) of card, having a rectangular main panel 2 along each edge of which is an edge panel 3, a fold line 4 defining the junction between the main panel and each edge panel. The edge panels do not extend to the corners of the main panel which are preferably radiused. The edge panels are displaced relative to the plane of the main panel and are bonded to a wall 5 of a continuous channel section injection moulding 6. The moulding includes an outer lip 7, spaced lugs 8, each of which will engage under an inward projection on the margin of a container which container margin will be received by the moulding 6, and a rib 9.

To produce the lid, the tools shown in FIGS. 1 to 4 are set up in an injection moulding machine having a fixed and a movable platen. These tools comprise a main first cavity tool 10, a main second cavity tool 11 and a main core tool 12. Each main tool is a multi-impression tool, in this case a four impression tool, there being four first cavity tools only two of which, 10a, 10b, are shown, four second cavity tools only two of which, 11a, 11b, are shown and four core tools 12a, 12b, 12c, 12d.

The main cavity tool 10 includes a back plate 13, a main plate 14 and a front plate 15. The front plate 15 forms a surround extending about first cavity tool end parts 17 each having projecting from its periphery a peripheral wall part 18 (FIG. 1) and ejector parts 19 each surrounding a part 17. The end parts 17 are provided with suitable cooling passages 20 which extend to connections 21 in the main plate 14. A hot runner nozzle 22 is provided in respect of each side of each end part 17 and each nozzle terminates in a pin gate 23, the location of which will be referred to later.

The core tools are carried by a plate 26 movable relative to a movable guide plate 27 which carries the second cavity tools.

In the core tool closed condition of FIG. 1, each core tool 12, end part 17, second cavity tool 11 and ejector parts 19 together define a moulding cavity 25, and a blank cavity 28 is defined between the front face of the core tool 12 and the end part 17 of the first cavity tool and extending into the moulding cavity 25. In the core tool open position, the core tool carrier plate 26 has moved to the left as seen in FIG. 1, as also has the plate 27 to move the second cavity tools 11 to a position in which they are sufficiently clear of the peripheral wall portions 18 to allow the mouldings to be sprung off by movement of the ejector parts 19. The plate 26 moves a distance leftwards so as to position the front faces of the core tools to the left of blank guide channels 30 in the rear of plate 27. The channels 30 are extended above plate 27 by ears 31a.

Each channel 30 comprises for each core tool a pair of opposed guideways 31, 32 which are spaced apart to receive a blank therebetween. Guideways 31a, 32a (FIGS. 1 to 3) serve core tool 12a, guideways 31b, 32b (FIGS. 1 and 3) serve the core tool 12b below tool 12a and guideways 31c, 32c and 31d, 32d serve tools 12c and 12d (FIG. 2). The guideways receive blanks from a magazine and are so positioned relative to the path of the core tools that when the core tools are in closed condition, as can be seen in FIG. 1, the core tools lie between the corresponding guideways. Blanks dropped into the guideways when the core tools are in closed condition are arrested by the rest on a surface of the upper core tools 12a and 12c or, in the present apparatus on a surface of the upper ones of four keeps 33 on the plate 26. Now when the core tools move to the open condition relative to plate 27, the blanks drop down their respective guideways each to a position spanning the path of relative movement of a core tool and opposite the left hand end of the respective cavity, e.g. 27a, 27b, in plate 27 corresponding to the cavity of the associated second cavity tools and first cavity tools.

Figure 7A:
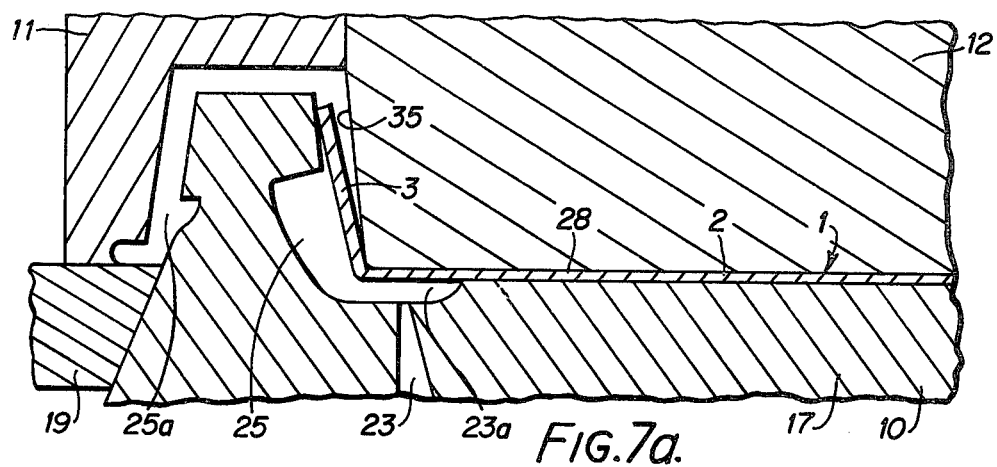
FIG. 7a is a broken, enlarged detailed view showing a blank clamped between the mould tools prior to injection of the moulding material.
Figure 7:
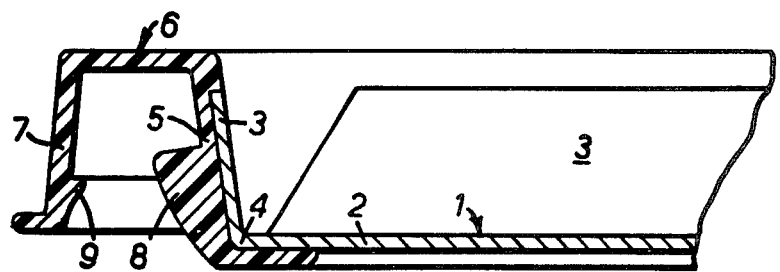
FIG. 7 is a section through a lid to be made with the tools of FIG. 1.

Upon movement of the core tools to the closed position, the front face of each core tool abuts the blank in front of it, holds it by vacuum applied centrally of the front face at 34 and pushes the blank through the associated cavity of plate 27 and the second cavity tool. In moving forward the plate 26 picks up plate 27 and moves it to a position abutting the ejector part 19 which abuts the surrounding plate 15. The edge panels of the blank will fold as the core tool drives the blank through the cavity in plate 27 and the second cavity tool. As can be seen in FIGS. 1 and 7a these edge panels will be received by a recess 35 in part defining a blank periphery-receiving and mould cavity 25 at each edge of the front face of the core tool. With the tools in closed position they also define a first continuous peripheral mould cavity 25a surrounding the blank periphery-receiving and mould cavity 25 which in turn surrounds the blank or main panel cavity 28. As can be seen in FIGS. 1 and 7a, each pingate is opposite a peripheral part of the end face of the core tool which is overlapped by a spaced peripheral part 23a of the first cavity tool, the pingate 23 opening into the overlapped region from the first cavity tool; the tools are closed with each side of the blank or each edge panel 3 overlying the associated pin gate 23 whereby, when synthetic plastics material is injected, the injected material presses the edge panel against the surface of recess 35 in the core tool to ensure that the edge panel is on the inwardly (relative to the blank) directed face of the channel section moulding as shown in FIG. 7. To provide adequately even pressure on the plate 27 during moulding, the four keeps 33, one in respect of each core tool, are provided, and these are received in channel 30 to give a solid abutment, in the region of the guideways, between the plate 26, plate 27 and the second cavity tools on the plate 27. When the moulding is complete, the core tools and second cavity tools withdraw and the ejector parts 19 strip the mouldings from the pheripheral wall parts 18 of the first cavity tools. In the withdrawal movement, the core tools separates from the second cavity tools, the front faces of the core tools moving behind the planes of the two pairs of guideways, 31a, 32a and 31b, 32b so that the blanks which have been resting on the upper keeps 33 of the upper core tools drop to their spanning positions and the cycle is repeated.

In addition to vacuum on the front face of each core tool, vacuum may be provided on the face of each end parts 17 as indicated at 36.

A four impression tool has been described and shown but the number of impressions may be varied. Also planar end parts 17 are shown whereas these and the front faces of the core tools may be shaped to deform the main panel of the blank as the tools close. Support plate 26 is carried by the movable platen of the machine and suitable guide bars and bushes are mounted on plate 26 and plate 14 to ensure correct relationships of the core and first and second cavity tools.

Figure 6:
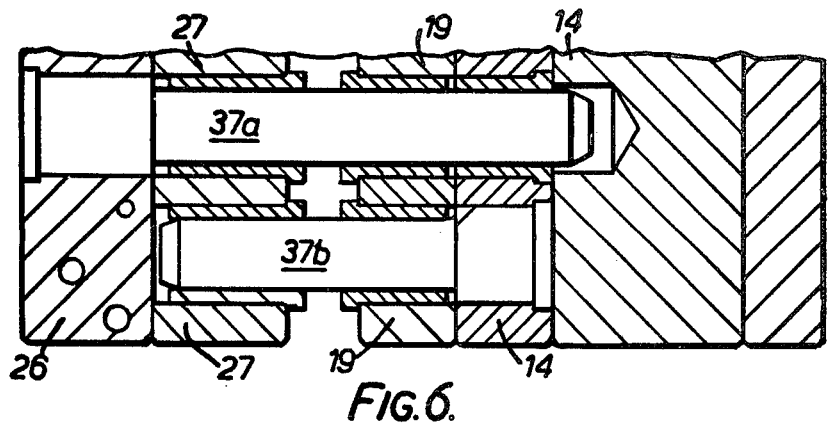
FIG. 6 is a section along the line VI—VI of FIG. 5.

Thus guide rods 37a, 37b (FIG. 6) are mounted on plate 26 and plate 14 respectively which respectively engage bushes in guide plate 27, ejector part 19 and plate 14, and ejector part 19 and plate 27. A rod 38 (FIG. 1) passes through the centre of the plate 26 and carries a head 38a engaging behind the ejector parts 19. This rod 38 is operated by means carried on the movable platen of the machine whereby as the platen approaches the open condition of the tools, the rod is pulled by the platen to pull the ejector parts 19 away from plate 14. The ejector parts return, on forward movement of the platen under action of return springs (not shown).

The plate 26 is coupled to the movable platen and pull rods 26a (FIG. 4) are provided on plate 26 which pull rods have heads 26b which engage plate 27 as plate 26 moves to the left as seen in FIGS. 1 and 4. Stop rods on the machine frame (not shown) lie in the path of the plate 27 as it moves away from the first cavity tool and arrest plate 27 at the correct position if that plate, through friction, travels back with the plate 26 during the leftwards motion referred to.

Preferably the vacuum lines to the front faces of the cavity tools are coupled to sensors to which the electrically operated valve of the injection moulding machine intensifier is responsive. By providing such sensors, the valve is rendered inoperable if no blank is present in an impression of the mould tools and damage due to operation of the intensifier in the absence of a blank is avoided.

Preferably the vacuum to the core tools is cut off and positive pressure is applied when the injection is complete and vacuum is applied to the end parts 17 of the first cavity tools to hold the articles in position as the mould tools separate and assist detachment of the articles from tools 11, 12.

Figure 8:
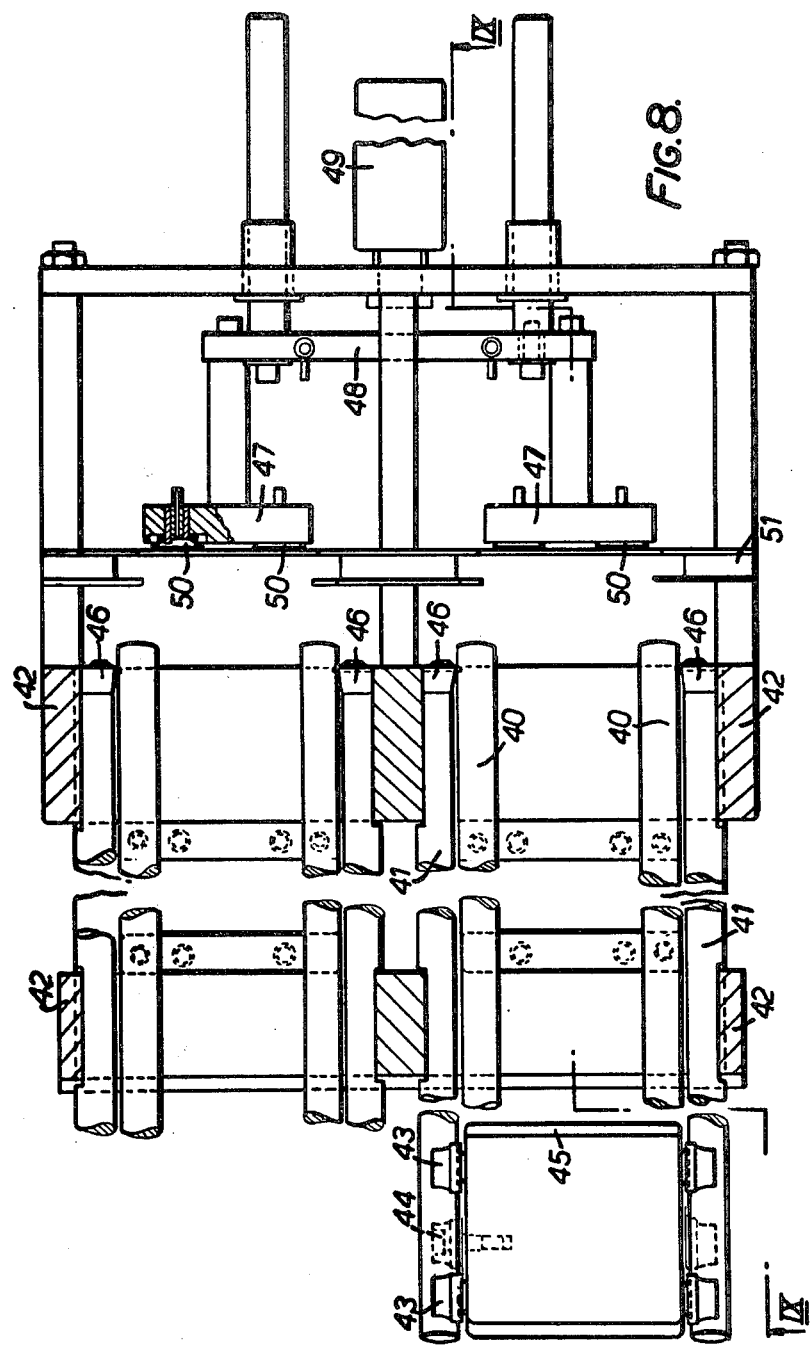
FIG. 8 is a plan view of a pair of magazines.
Figure 9:
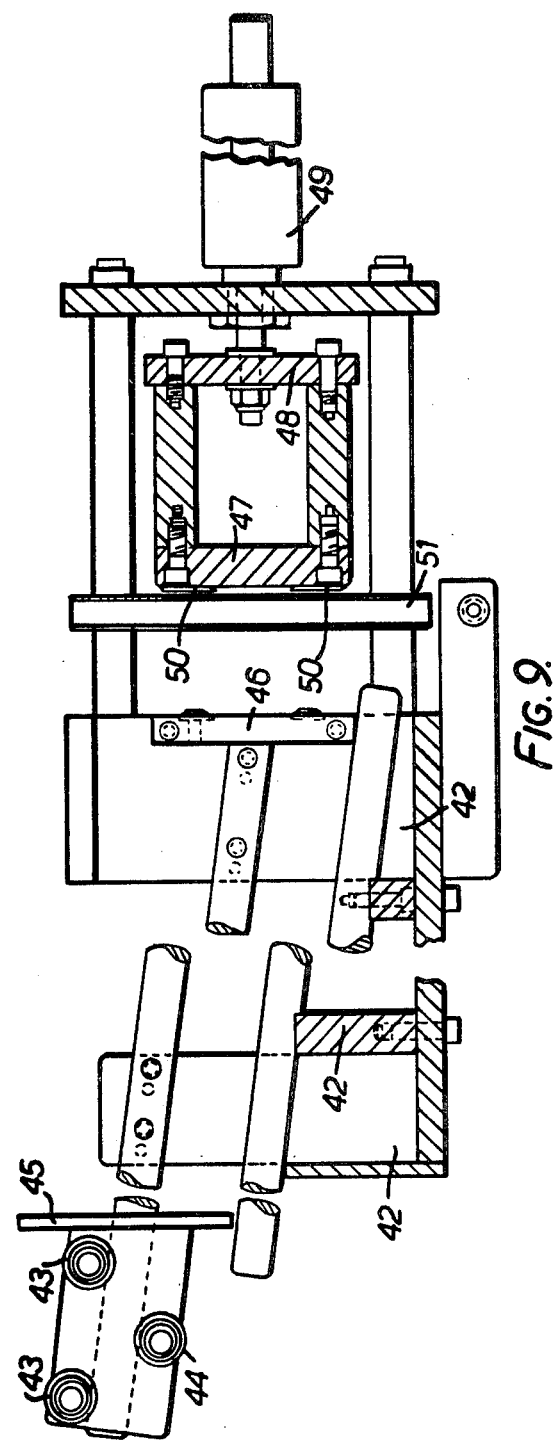
FIG. 9 is a section on the line IX—IX of FIG. 8.
Figure 10:
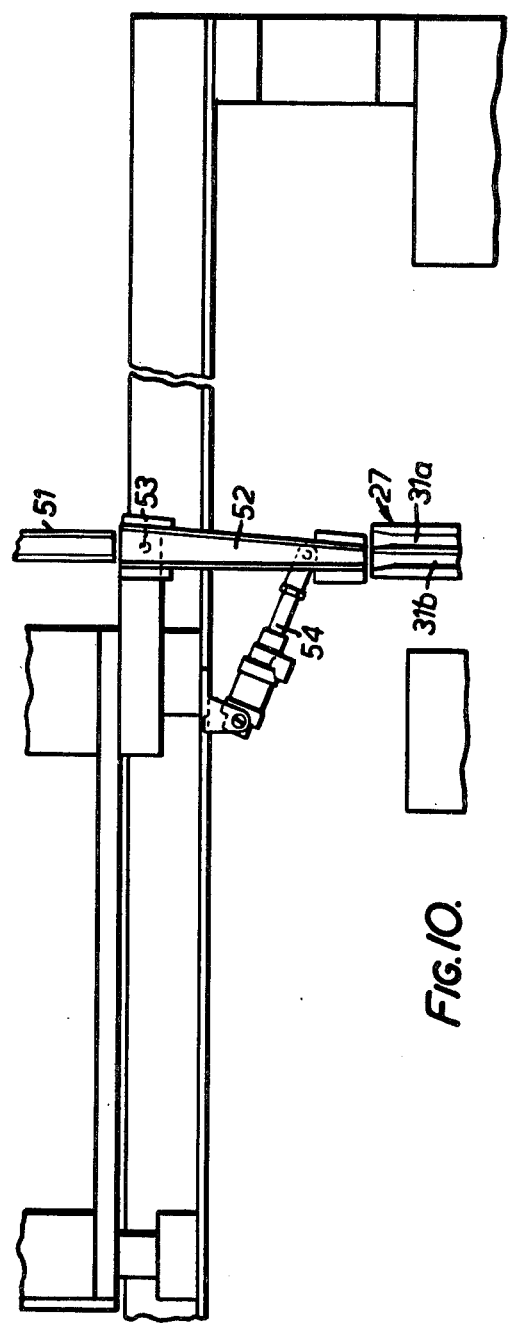
FIG. 10 is a detail of a delivery chute.

To feed blanks to the guideways, each pair of superposed impressions is provided with a magazine. Referring to FIGS. 8 to 10 each magazine has two inclined blank support rails 40 and two side rails 41 all suitably supported by plates such as 42. On each side rail of each magazine run two upper rollers 43 and one lower roller 44 of a pusher 45 which will urge a pack of blanks ahead of it on the lower rails and between the side rails towards an adjustable gate 46 through which the blanks will not pass under the action of the pusher. A pair of withdrawal plates 47, one for each magazine, is carried by a yoke 48 actuated by a ram 49. Suitable control means actuate the ram and valves controlling vacuum heads 50 on the plates 47, so that a blank is drawn through each of the pair of gates simultaneously by the plates 47 and is dropped into a guide 51 located over a chute 52. The chute 52 is pivoted at 53 and itself actuated by a ram 54 for movement between the guideways. By control of ram 54 a pair of blanks will be deposited alternatively in guideways 31a, 32a, 31c, 32c and in 31b, 32b and 31d, 32d. This delivery of blanks to the guideways is sufficiently rapid that the guideways are loaded while the core tools are in the closed condition and injection is taking place. The blanks are held in the guideways while the tools are closed and as above described drop into place as plates 26, 27 move to their separated condition.

I claim:

1. Apparatus for making a composite article including a blank and an injection moulding thereon, the apparatus comprising:
   a set of mould tools which are relatively movable between an open condition and a closed condition in the latter of which they define a blank receiving cavity in which a blank will be clamped between them and a mould cavity;
   support means on which the set of tools is carried for relative movement therebetween;
   guide means carried by the support means for guiding a blank under gravity from a position outside the path of relative movement of the tools to a position intersecting the path wherein relative movement of the tools will cause the blank to be clamped therebetween; and
   stop means carried by the support means and operative to hold a blank in the guide means above the tool path when the tools are in the closed condition, said stop means being operated in response to movement of the tools to an open condition to allow the blank to fall to the tool path intersecting position;
   said set of mould tools comprising a core tool and first and second cavity tools, said tools being movable between an open condition and a closed condition in the latter of which they define said cavities, said mould cavity being defined by the core tool and the first and second cavity tools and said blank receiving cavity being defined by the core tool and the first cavity tool;
   said first cavity tool including a base part and an ejector part movable relative to said base part for ejecting an article when the first and second cavity tools are moved apart;
   said mould cavity extending peripherally of and overlapping the blank receiving cavity, the blank receiving cavity having a generally planar central part and a peripheral part inclined to the general plane of the central part, the mould cavity having a first part overlapping the blank receiving cavity in the inclined part thereof and including a second part extending outwardly therefrom, the blank receiving cavity being defined between the base part of the first cavity tool and the core tool, and the second part of the mould cavity being defined between the second cavity tool and the base and ejector parts of the first cavity tool.

2. Apparatus for making a composite article including a blank having a peripheral injection moulding thereon, the apparatus comprising a core tool having an end face to engage a first face of a main panel of a blank and a peripheral face, a first cavity tool for engaging the other face of the main panel, an inner peripheral face adapted to cooperate with the peripheral face of the core tool, and an outer peripheral face, a second cavity tool having an inner face which cooperates with the outer peripheral face of the first cavity tool, a mechanical ejector cooperating with said tools, a support on which the core tool, first and second cavity tools and ejector are mounted for movement relative to one another, means for moving the core tool, the first and second cavity tools and ejector relative to each other between open and closed conditions of the tools and ejector, the peripheral faces of the core tool and first and second cavity tools and the ejector together defining a mould cavity surrounding a blank receiving cavity in the closed condition of the tools and ejector, guide means mounted on the support to guide a blank movable along a path under gravity to a position in which the main panel lies between the end faces of the core tool and the first cavity tool when the tools and ejector are in their open condition, and injection means mounted on the support opening into the mould cavity and located in the first cavity tool opposite an end face of the core tool, said tools being constructed and arranged that on relative movement of the tools from the open to the closed condition with a blank main panel between the end faces of the core tool and first cavity tool a peripheral part of the blank is displaced relative to the main panel and positioned in said mould cavity between the outer peripheral surface of the core tool and the inner peripheral face of the first cavity tool with the peripheral part of the blank overlying the injection means, said ejector being constructed and arranged that upon relative movement of the tools and the ejector to their open condition said ejector engages the moulding to drive the same off the first cavity tool and separates the completed composite article from said apparatus.

3. Apparatus for making a composite article including a blank of sheet material having a peripheral injection moulding thereon comprising:
   I. a core tool having:
      a. an end face to engage a first face of a main panel of a blank, and
      b. an outer peripheral face adjacent to and surrounding said end face;
   II. a first cavity tool having:
      a. an end face opposed to the end face of the core tool for engaging the main panel of a blank;
      b. an inner peripheral face adapted to cooperate with the peripheral face of the core tool; and
      c. an outer peripheral face;
   III. a second cavity tool having:
      a. an inner face which cooperates with the outer peripheral face of the first cavity tool;
   IV. means operatively connected to the core tool and the first and second cavity tools for moving the same relative to each other between open and closed conditions of the tools, the peripheral faces of the core tool and first and second cavity tools being spaced from each other in the closed condition of the tools to define a continuous peripheral mould cavity surrounding a main panel receiving cavity defined between the opposed end faces of the core and first cavity tools, a portion of the spaced peripheral part of the first cavity tool overlapping a peripheral part of the end face of the core tool;

V. guide means disposed in a position intersecting the path of movement of said core tool and arranged to guide a blank movable along a path under gravity to a position in which the main panel lies between the end faces of the core tool and first cavity tool when the tools are in their open position, and VI. injection means located in the first cavity tool and opening into the mould cavity opposite the overlapped peripheral part of the end face of the core tool;

VII. said tools being constructed and arranged that on relative movement of the tools from the open to closed position the blank main panel is clamped between the end faces of the core tool and first cavity tool and the peripheral part of the blank is
   a. displaced relative to the main panel in the direction of the core; and
   b. positioned in said peripheral mould cavity between the outer peripheral face of the core tool and the inner peripheral face of the first cavity tool with
      i. one face of the displaced peripheral part of the blank exposed to the injection means in the first cavity tool; and
      ii. the other face of the displaced peripheral part of the blank being adjacent the peripheral face of the core tool so that material injected from the injection means into the peripheral mould cavity presses the displaced peripheral part of the blank against the peripheral part of the core tool.

4. Apparatus as in claim 3 including a mechanical ejector cooperating with said first and second cavity tools to define a portion of the mould cavity, said means for moving the mould tools also effecting movement of said ejector whereby said ejector is movable by said means relative to said tools, said ejector being constructed and arranged that upon relative movement of the tools and the ejector to their open condition, said ejector engages the moulding to drive the same off the first cavity tool and separate said composite article from said apparatus.

5. The apparatus of claim 3 wherein the outer peripheral face of the core tool is inclined outwardly relative to the end face of the core tool.

6. Apparatus for making a composite article including a blank of sheet material having a peripheral injection moulding thereon comprising:

I. a core tool including:
   a. a main end face to engage a first face of a main panel of a blank, and
   b. a peripheral face;

II. a first cavity tool having:
   a. a main end face opposed to the main end face of the core tool for engaging the main panel of a blank;
   b. a first peripheral face adapted to cooperate with the peripheral face of the core tool; and
   c. a second peripheral face;

III. a second cavity tool having:
   a. a peripheral face which cooperates with the second peripheral face of the first cavity tool;

IV. means operatively connected to the core tool and the first and second cavity tools for moving them relative to each other between open and closed conditions of the tools, the peripheral faces of the core tool and first and second cavity tools being spaced from each other in the closed condition of the tools to define
   a. a first continuous peripheral mould cavity and
   b. also a blank periphery-receiving and mould cavity surrounded by the first mould cavity and in turn surrounding a main panel receiving cavity defined between the opposed main end faces of the core and first cavity tools.

V. guide means disposed in a position intersecting the path of said core tool and arranged to guide a blank movable along a path under gravity to a position in which the main panel lies between the end faces of the core tool and first cavity tool when the tools are in their open position; and VI. injection means located in the first cavity tool and opening into the blank periphery-receiving mould cavity;

VII. said tools being constructed and arranged that on relative movement of the tools from the open to the closed position the blank main panel is clamped between the end faces of the core tool and first cavity tool and the peripheral part of the blank is
   a. displaced relative to the main panel in in direction of the core; and
   b. positioned in said blank periphery-receiving and mould cavity between the peripheral face of the core tool and the first peripheral face of the first cavity tool with
      i. one face of the displaced peripheral part of the blank exposed to the injection means in the first cavity tool; and
      ii. the other face of the displaced peripheral part of the blank being adjacent the peripheral face of the core tool so that material injected from the injection means into the blank periphery-receiving and mould cavity presses the displaced peripheral part of the blank against the peripheral part of the core tool.

* * * * *